United States Patent [19]

Steelman

[11] 3,887,817

[45] June 3, 1975

[54] POWER GENERATING DEVICE

[76] Inventor: Gerald E. Steelman, R.R. 3, Adel, Iowa 50003

[22] Filed: Dec. 20, 1973

[21] Appl. No.: 426,804

[52] U.S. Cl. .......................... 290/43; 290/54; 415/5
[51] Int. Cl. ............................................. F03b 13/10
[58] Field of Search ................. 415/6, 8, 5; 60/398; 417/334; 290/42, 43, 53, 54

[56] References Cited
UNITED STATES PATENTS

| | | | |
|---|---|---|---|
| 629,250 | 7/1899 | Henretty | 416/7 |
| 1,751,513 | 3/1930 | Gaede | 415/5 |
| 1,757,894 | 5/1930 | Zvirblis | 415/5 |
| 3,504,985 | 4/1970 | Fisher | 415/5 |

*Primary Examiner*—G. R. Simmons
*Attorney, Agent, or Firm*—Zarley, McKee, Thomte & Voorhees

[57] ABSTRACT

A power generating device comprises a continuous elongated flexible loop member having opposite loop ends and adapted to be suspended in a current of flowing fluid. The loop member is trained around a rotatable member which in turn is drivingly connected to an electrical generating power means. A plurality of flexible and collapsible containers or sails are mounted in spaced relationship and in end to end relationship along the loop member. When immersed in a current of moving fluid, the containers will be expanded and filled by the fluid when their open ends are facing upstream in relation to the current and they will be collapsed and emptied of fluid when their open ends are facing downstream in relation to the current. Thus the containers will drive the loop member and consequently the rotatable member continuously whenever the loop member and containers are immersed in a flowing fluid material.

11 Claims, 4 Drawing Figures

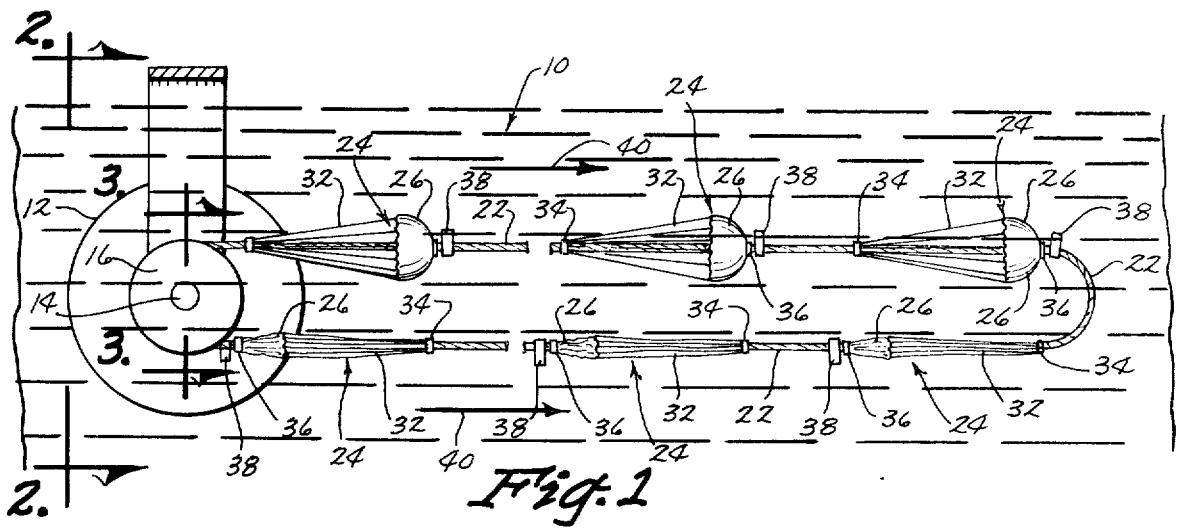
Fig. 1
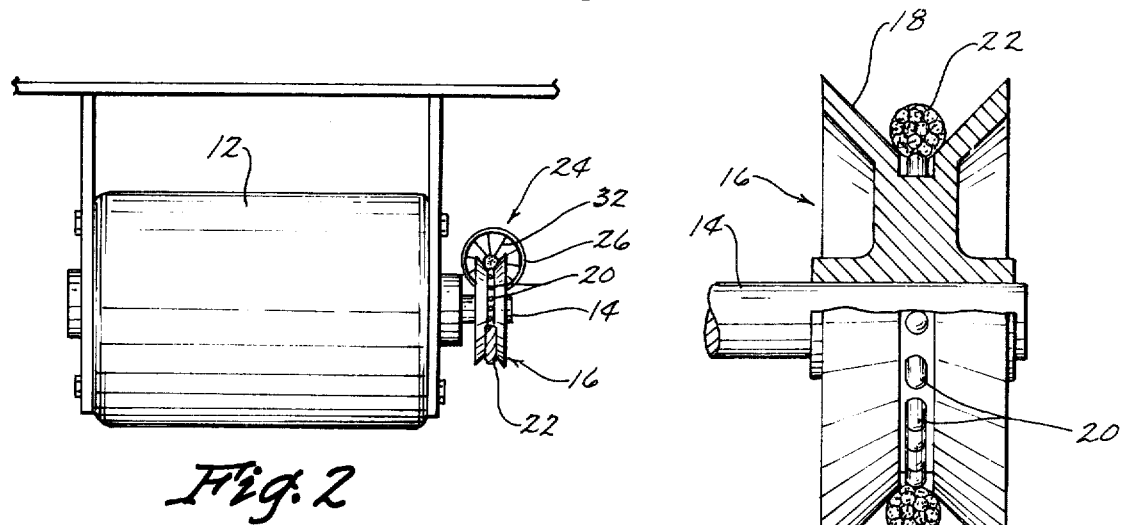
Fig. 2
Fig. 3
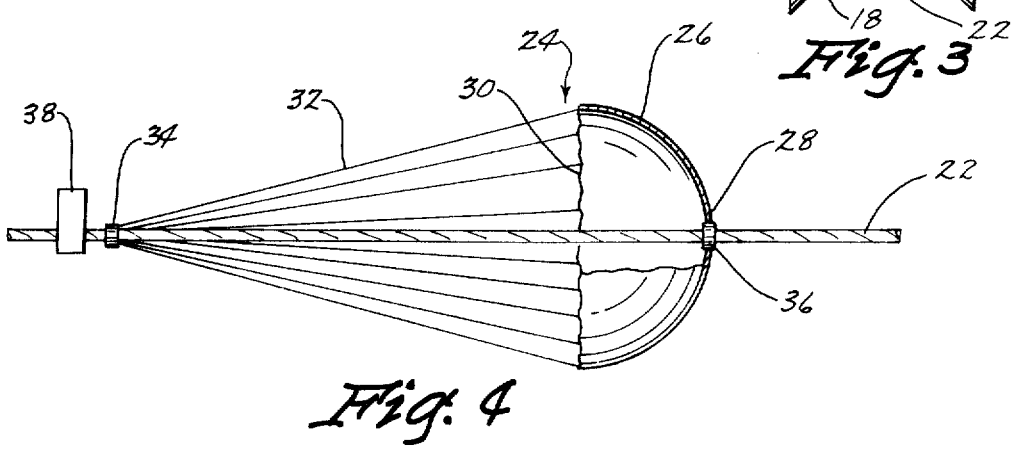
Fig. 4

POWER GENERATING DEVICE

This invention relates to a power generating device and specifically a power generating device which can convert the flow of fluid into mechanical energy which can be tapped for driving conventional power generating devices.

Previous attempts have been made for harnessing the current in tides in ocean currents and in rivers to produce electrical power. One concept which has been attempted is the use of a looped supporting member having a plurality of sails therein for catching and being driven by the moving current. However, these previous devices required pulleys or other free wheeling members at opposite ends of the loop so as to maintain the position of the loop member and prevent it from becoming entangled during operation. Consequently, previously known devices, while utilizing flexible loop members, caused the loops to have a rigid form as a result of their being trained around two spaced apart pulleys. When two pulleys are used, considerably more structure is required for the generating device and also there are limitations as to the length and diameter of the loop member which may be employed. The loop member cannot be lengthened or shortened without also lengthening or shortening the respective distances between the pulleys.

Furthermore, previous concepts relied upon various rigid mechanical structure such as hinges, spars, booms, masts, cogs, guides, guards, rollers, tracks, trip levers and the like to direct the vanes, paddles and the like into prescribed directions and also to cause the vanes and paddles to be alternately extended or retracted. These mechanical structures placed very real limitations upon the size and thus capability of the previous power generating devices to produce usable power. These various mechanical structures required in previous devices necessitated considerable weight of the masts, booms, spars, vanes and paddles and consequently considerable weight of the supporting loop member, which in turn caused considerable friction between the various components while operating the various rollers, trip levers, hinges, guides and the like. This structural weight and friction required considerable force to operate the various mechanisms and required a considerable counter productive force to return the sails and paddles to the upstream position. Such size and frontal area as was necessary to fabricate masts, booms, spars, and the like caused considerable drag in the fluid current during the return of the paddles to the upstream positions. Therefore the paddles of previous devices required a considerable counter productive force to return the paddles or sails to the upstream position, thereby further reducing their efficiency.

The present invention utilizes a flexible loop having a plurality of parachute-like containers along its circumference. It utilizes only one pulley and the loop drifts downstream from that pulley without being trained around a second pulley. Since only one pulley is necessary and since the remainder of the loop drifts downstream therefrom, there is no limit as to the length of the loop. The parachutes are automatically expanded when their open ends are presented facing upstream, and they are automatically collapsed by the flow of the fluid when they are being retrieved with their open ends facing downstream.

Furthermore, the present invention eliminates the need for additional mechanical apparatus such as hinges, spars, rollers, booms, masts, cogs, trip levers, guides or the like to cause the flexible, collapsible containers to open or to close. Also eliminated is the need for apparatus such as a track, rail, guide or pulley to direct the downstream portion of the loop into a prescribed course.

Therefore, a primary object of the present invention is the provision of a device which will convert flowing fluid into mechanical power which can be used for producing electrical power, mechanical power and the like.

A further object of the present invention is the provision of a device which is easily transported and placed in operation within any stream of fluid or within any ocean tide.

A further object of the present invention is the provision of a device which can utilize a loop of any desired length and diameter so as to achieve the necessary torque for rotating a generator rotor.

A further object of the present invention is to provision of a device which minimizes the equipment necessary for harnessing the flow of fluids, and specifically eliminates the need for two pulleys.

A further object of the present invention is the provision of a device which is simple in construction, economic to manufacture and durable in use.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is an elevational view of the device immersed in a stream of flowing fluid.

FIG. 2 is a sectional view taken along line 2—2 of FIG. 1.

FIG. 3 is a sectional view taken along line 3—3 of FIG. 1.

FIG. 4 is an enlarged partially sectioned view of one of the parachutes or sails utilized in the present invention.

Referring to the drawings, the numeral 10 generaly designates the power generating device of the present invention. An electrical generator 12 includes a rotor therein (not shown) and a rotor shaft 14 operatively connected to the rotor and protruding outwardly from the housing of the generator. A pulley 16 is fixed to rotor shaft 14 by keying or the like. Pulley 16 is shown in cross section in FIG. 3, and incudes a V-shaped cleavage 18 having a plurality of nodules or bumps 20 at the apex of the V-shaped cleavage 18. Nodules 20 provide additional friction at the apex of cleavage 18 so as to insure maximum friction between the pulley and the flexible member which is trained therearound.

Pulley 16 is shown in the drawings to be directly connected to the shaft 14 of the generator rotor. However, various gear or transmission systems may be chosen to drivingly connect the rotating pulley to a power generating device. Furthermore, power means other than an electrical generator may be driven by pulley 16. For example, a pump (either hydraulic or pneumatic) could be driven by pulley 16.

A flexible member 22 is trained around pulley 16 as shown in FIGS. 1 – 3. Member 22 may be formed of rope or flexible cable, and the material used for member 22 may be any conventional material used for such components including manilla, nylon, or the like. The primary requisite of member 22 is that it be flexible much in the same fashion as conventional rope or line. Member 22 is formed in a continuous loop which has a circumference greater than pulley 16.

Attached to flexible member 22 are a plurality of flexible collapsible containers or sails 24 each of which has a configuration similar to a parachute. Each container 24 is comprised of a flexible canopy 26 having a closed end 28 and an open end 30. Around the circumference of open end 30 are attached a plurality of lines 32 which are similar to the lines attached to a parachute canopy. Each line 32 is attached at one of its ends to the periphery of open end 30, and at the other of its ends to flexible member 22. A clip 34 surrounds flexible member 22 and attaches the ends of lines 32 to flexible member 22. A similar clip 36 attaches closed end 28 of canopy 26 to flexible member 22 at a point spaced apart from clip 34. Flexible member 22 extends through the geometric center of a cross section of container 24 so that all forces exerted by the fluid against flexible container 24 are symmetrically distributed with respect to flexible member 22.

In the drawings flexible member 22 is shown as a singular continuous loop with containers 24 clipped thereon. However, member 22 may be comprised of a plurality of segments which interconnect containers 24 so that the segments alternate with the containers to comprise the circumference of the loop. Furthermore, member 22 may be eliminated altogether by interconnecting the parachutes or containers 24 together in chainlike fashion to form a continuous loop member.

Adjacent each container is a bouyancy correcting member 38. The specific gravity of member 38 is to be determined by the specific gravity of the combination of containers 24 and flexible member 22. The purpose of member 38 is to adjust the bouyancy of the entire component so that containers 24 and loop member 22 maintain a neutral bouyancy. Thus, if the flexible member 22 and containers 24 tend to sink in the fluid in which they are used, correcting members 38 are small bouys which neutralize this sinking tendency. Conversely, if flexible containers 24 and flexible members 22 tend to float upwardly, bouyancy correcting members 38 are slugs or weights which neutralize this floating tendency.

In operation, pulley 16 is immersed in a flowing current of fluid as illustrated in FIG. 1. Arrow 40 indicates the direction of fluid flow. In FIG. 1 both pulley 16 and generator 12 are shown immersed in the fluid, but the structure of these devices may be modified so that only pulley 16 is immersed in the fluid and generator 12 may be placed above the surface of the fluid. Furthermore, it may be possible to operate the present invention with both pulley 16 and generator 12 above the fluid surface, but with flexible member 22 immersed in the fluid with the exception of the portion which extends over pulley 16. As illustrated in FIG. 1, the flow of the fluid causes canopies 26 of containers 24 to be filled with fluid and expanded whenever open ends 30 of canopies 26 are presented facing upstream against the flow of fluid. Canopies 26 may be comprised of a cloth-like material or any flexible material which will expand or collapse in response to the pressure from the fluid. As the fluid fills canopies 26, it exerts a force on these canopies in the same direction as arrow 40 shown in FIG. 1. This force causes flexible member 22 to move in a clockwise direction as illustrated in FIG. 1 thereby causing pulley 16 to be rotated. As containers 24 approach the extreme end of the loop formed by flexible member 22, they reverse their direction and begin their return trip towards pulley 16. When the direction of containers 24 is reversed, the closed ends 28 of canopies 26 are presented facing upstream, and the pressure of fluid flow causes canopies 26 to collapse thereby insuring that the fluid exerts a lesser force on the returning canopies than it does on the canopies which are moving away from pulley 16. Consequently, the net force acting on felxible member 22 is in a clockwise direction as viewed in FIG. 1.

The bumps 20 on pulley 16 contribute to the friction between flexible member 22 and pulley 16 so as to insure that pulley 16 is rotated in response to the rotational movement of flexible member 22. The more surface area of canopies exposed to the current, the greater the total force exerted on pulley 16. The surface area, and consequently the total force on pulley 16, can be increased either by increasing the total number of containers on loop member 22 or by increasing the size of canopies 26. In this regard, it should be noted that only one pulley is used with the loop member formed by flexible member 22. This is true regardless of what length or diameter is chosen for loop member 22. The fluid currents which swirl around the periphery of open ends 30 of canopies 26 cause the two parallel portions of loop member 22 to be separated. Consequently, the chances of loop member 22 becoming entangled are minimal. Not only does lengthening of flexible member 22 increase the torque applied to pulley 16, but it also increases the friction between flexible member 22 and cleavage 18 of pulley 16, thereby reducing the slippage therebetween.

Thus it can be seen that the device accomplishes at least all of its stated objectives.

I claim:

1. A power generating device comprising:
   a frame;
   a continuous elongated flexible loop member adapted to be suspended in a current of moving fluid, said loop member having opposite end loop portions and including a plurality of flexible and collapsible containers;
   each of said containers being comprised of a flexible material which is free to collapse radially inwardly towards the longitudinal axis of said loop member;
   each of said flexible containers having an open end and a closed end, each of said containers being adapted to open and to capture and hold a quantity of fluid when said open end extends towards an oncoming current of fluid, and being adapted to collapse and empty said quantity of fluid when said closed end extends towards an oncoming current,
   a rotatable member rotatably mounted to said frame;
   and one end loop portion of said loop member embracing said rotatable member, whereupon movement of said loop member by a moving current of fluid will impart rotational movement to said rotatable member.

2. A power generating device according to claim 1 wherein said flexible containers are secured to one another in end to end relation to form said loop member.

3. A power generating device according to claim 1 wherein a plurality of flexible support segments are positioned alternatively between said containers and interconnect said containers to form said loop member.

4. A power generating device according to claim 1 wherein said loop member includes a continuous flexible support member, said containers being attached to said support member.

5. A power generating device according to claim 4 wherein said flexible member extends through the center of a cross section through each of said containers, said cross section being taken transversely to the longitudinal axis of said flexible member.

6. A power generating device according to claim 1 wherein said rotatable member comprises a rotatable wheel, said loop member being trained around only said wheel and having a circumference greater than said wheel whereby a slack portion of said loop member is free to drift downstream from said wheel.

7. A power generating device according to claim 1 wherein each of said containers has a plurality of lines connected around the periphery of said open end, means operatively connecting said lines to said closed end of another of said containers.

8. A power generating device according to claim 1 wherein said rotatable member comprises a pulley, having a V-shaped cleavage therein for receiving said loop member as it trains around said pulley, said cleavage having a plurality of radially outwardly projecting protrusions which increase the friction between said loop member and said pulley.

9. A power generating device according to claim 1 wherein an electrical generating means is drivingly connected to said rotatable member whereby rotation of said rotatable member causes said electrical generating means to generate electricity.

10. A power generating device comprising;
   a frame;
   a continuous elongated flexible loop member adapted to be suspended in a current of moving fluid, said loop member having opposite end loop portions and including a plurality of flexible and collapsible sails thereon, each of said sails being collapsible in response to fluid pressure against one of its sides and being adapted to catch and be driven by fluid pressure exerted against the side of said sail opposite from said one side;
   a single rotatable wheel rotatably mounted to said frame;
   said loop member being trained around only said single wheel and having a circumference greater than the circumference of said wheel whereby one of said loop end portions extends around said wheel and the other of said loop end portions drifts downstream from said wheel when said loop member is suspended in a current of moving fluid.

11. A power generating device according claim 10 wherein an electrical generating means is drivingly connected to said rotatable wheel whereby rotation of said rotatable wheel causes said electrical generating means to generate electricity.

* * * * *